(12) United States Patent
Tseng et al.

(10) Patent No.: US 12,505,897 B2
(45) Date of Patent: Dec. 23, 2025

(54) PROGRAM REFRESH WITH GATE-INDUCED DRAIN LEAKAGE

(71) Applicant: Micron Technology, Inc., Boise, ID (US)

(72) Inventors: Huai-Yuan Tseng, San Ramon, CA (US); Eric N. Lee, San Jose, CA (US); Akira Goda, Tokyo (JP); Kishore Kumar Muchherla, San Jose, CA (US); Tomoharu Tanaka, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 232 days.

(21) Appl. No.: 18/223,298

(22) Filed: Jul. 18, 2023

(65) Prior Publication Data
US 2024/0038316 A1 Feb. 1, 2024

Related U.S. Application Data

(60) Provisional application No. 63/392,308, filed on Jul. 26, 2022.

(51) Int. Cl.
*G11C 29/12* (2006.01)
*G11C 16/34* (2006.01)

(52) U.S. Cl.
CPC .... *G11C 29/12005* (2013.01); *G11C 16/3431* (2013.01); *G11C 2029/1202* (2013.01); *G11C 2029/1204* (2013.01)

(58) Field of Classification Search
CPC ...................... G11C 29/12005; G11C 16/3431
USPC .................................................. 365/185.17
See application file for complete search history.

(56) References Cited

U.S. PATENT DOCUMENTS

2021/0391024 A1* 12/2021 Chen .................. G11C 16/3459
2022/0093149 A1* 3/2022 Sakuma .............. G11C 11/5657

* cited by examiner

*Primary Examiner* — Anthan Tran
(74) *Attorney, Agent, or Firm* — Lowenstein Sandler LLP

(57) ABSTRACT

A memory device includes a memory array including wordlines and at least one string of cells. Each cell of the at least one string of cells is addressable by a respective wordline. The memory device further includes control logic, operatively coupled to the memory array, to perform operations including generating gate-induced drain leakage (GIDL) with respect to the at least one string of cells, and causing a grounding voltage to be applied to a set of wordlines to ground each cell of the at least one string of cells addressable by each wordline of the set of wordlines. The grounding voltage applied to the set of wordlines enables transport of positive charge carriers generated by the GIDL. In some embodiments, the positive charge carriers neutralize a buildup of negative charge carriers generated during a seeding phase of a program refresh operation.

20 Claims, 8 Drawing Sheets

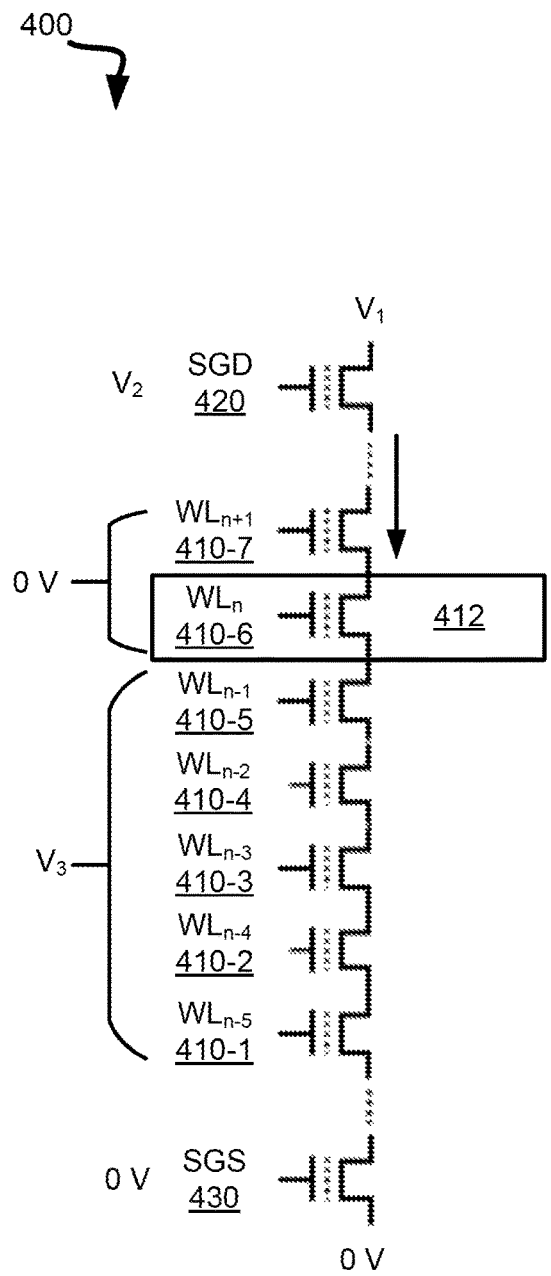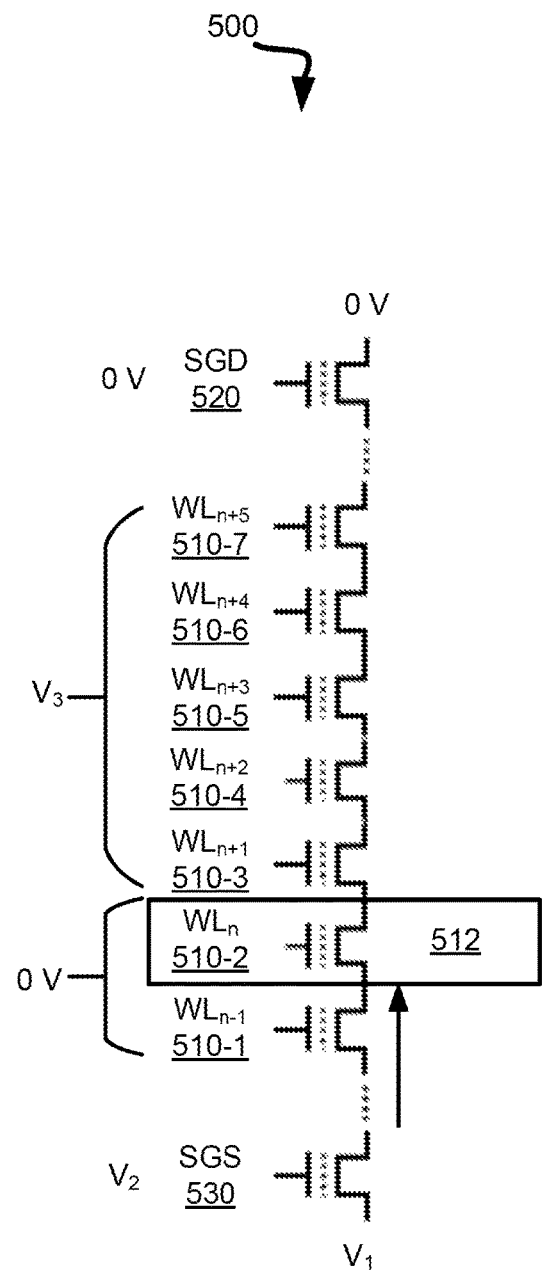
FIG. 4  FIG. 5

PROGRAM REFRESH WITH GATE-INDUCED DRAIN LEAKAGE

RELATED APPLICATION

This application claims the benefit of U.S. Provisional Application 63/392,308, filed on Jul. 26, 2022 and entitled "PROGRAM REFRESH WITH GATE-INDUCED DRAIN LEAKAGE", the entire contents of which are incorporated by reference herein.

TECHNICAL FIELD

Embodiments of the disclosure relate generally to memory sub-systems, and more specifically, relate to program refresh with gate-induced drain leakage (GIDL).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 3-5 are diagrams illustrating examples of program refresh with gate-induced drain leakage (GIDL) implemented for portions of an array of memory cells, in accordance with some embodiments of the present disclosure.

DETAILED DESCRIPTION

Figure 1A:
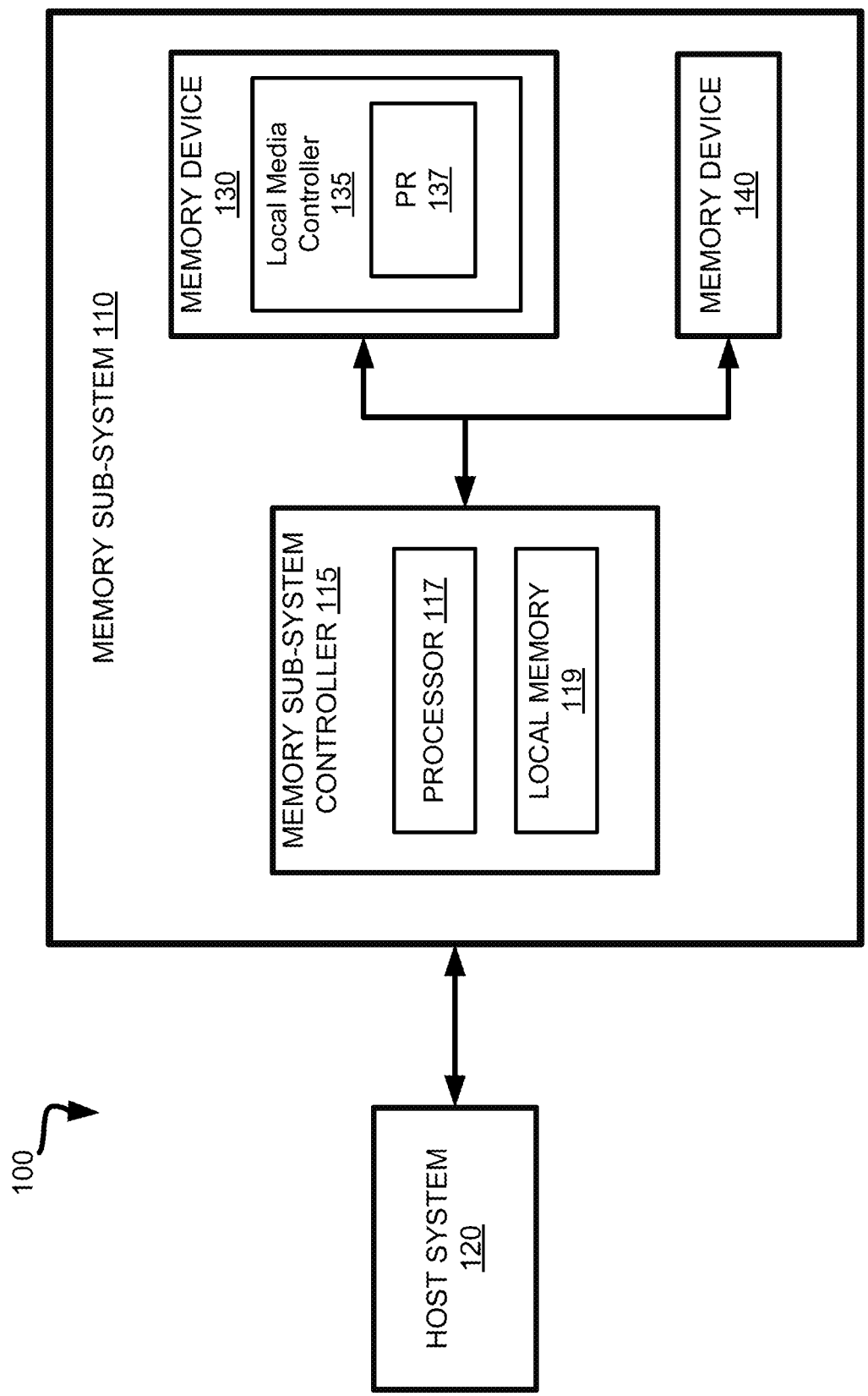
FIG. 1A illustrates an example computing system that includes a memory sub-system in accordance with some embodiments of the present disclosure.

Aspects of the present disclosure are directed to implementing program refresh with gate-induced drain leakage (GIDL). A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g., oxide) layer. A 3D memory device can have a "top deck" corresponding to a first side and a "bottom deck" corresponding to a second side. Without loss of generality, the first side can be a drain-side and the second side can be a source-side. For example, a 3D memory device can be a 3D replacement gate memory device having a replacement gate structure using wordline stacking.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the "threshold voltage") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The cells can, therefore, be characterized by a distribution P of the threshold voltages, $P(Q,V_T)=dW/dV_T$, where dW represents the probability that any given cell has its threshold voltage within the interval $[V_T, V_T+dV_T]$ when charge Q is placed on the cell.

A memory device can exhibit threshold voltage distributions $P(Q,V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A valley margin can also be referred to as a read window. For example, in a SLC cell, there is 1 read window that exists with respect to the 2 $V_T$ distributions. As another example, in an MLC cell, there are 3 read windows that exist with respect to the 4 $V_T$ distributions. As yet another example, in a TLC cell, there are 7 read windows that exist with respect to the 8 $V_T$ distributions. As yet another example, in a QLC cell, there are 16 read windows that exist with respect to the 16 $V_T$ distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

There is an inverse relationship between the number of bits per cell stored in a given cell and cost per bit (e.g., QLC cells cost less than TLC cells, TLC cells cost less than MLC cells, MLC cells cost less than SLC cells). Therefore, it may be beneficial to store additional bit(s) per cell within a particular memory device having a particular size. However, since the additional $V_T$ distributions defining the additional bit(s) per cell will share the same $V_T$ window with the previous $V_T$ distributions, it may not be possible in typical memory device implementations to add $V_T$ distributions to achieve increased bit per cell storage. Moreover, as the number of bits per cell increases, less read margin typically exists between adjacent $V_T$ distributions.

Aspects of the present disclosure address the above and other deficiencies by implementing program refresh with gate-induced drain leakage (GIDL). For example, embodiments described herein can, for a particular memory device configured to store an original number of bits per cell that define a number of original $V_T$ distributions, support the storing of at least one more bit per cell for the memory device defining a number of additional $V_T$ distributions. More specifically, as compared to an original width of the original $V_T$ distributions, embodiments described herein can be used to achieve a smaller $V_T$ distribution width of the original and additional $V_T$ distributions. As another example, embodiments described herein can be applied to increase RWB to store a same number of bits per cell (i.e., without requiring additional $V_T$ distributions). Accordingly, embodiments described herein can condense or tighten the $V_T$ distributions to recover RWB.

For example, a local media controller (e.g., NAND controller) can initiate a loop of the program refresh operation with respect to a wordline selected from a set of wordlines of the memory array. Initiating the loop can include setting a program pulse. Generally, a program refresh operation described herein can be performed to refresh data stored on cells addressable by (e.g., connected to) a programmed wordline to recover the RWB from an initial point in time. The program refresh operation "touches up" the stored data.

Prior to initiating the loop of the program refresh operation, the local media controller can read out data from the memory device (e.g., NAND), send the data to a memory sub-system controller (e.g., SSD controller) to perform error correction using error correction code (ECC) to obtain error-corrected data, receive the error-corrected data from the memory sub-system controller, and initiate the loop of the program refresh operation after receiving the error-corrected data.

After initiating the loop of the program refresh operation, the local media controller can program a set of cells addressable by the wordline. More specifically, the set of cells can be programmed with the program pulse. The local media controller can then initiate a program verify operation with respect to the set of cells. The local media controller can determine whether to perform an additional loop of the program refresh operation by determining whether the set of cells passes the program verify operation. More specifically, during the program verify operation, the local media controller can cause a target bias voltage to be applied to the wordline for sensing the set of cells. From the sensing, the local media controller can determine whether each cell of the set of cells has a higher $V_T$ than the target bias voltage. If so, then each cell of the set of cells has reached the target bias voltage and the additional loop is not needed (i.e., the current loop is the final loop). Thus, the program refresh operation will conclude for the wordline.

Otherwise, if the least one cell of the set of cells does not have a higher $V_T$ than the target bias voltage), then the program refresh loop can further include a seeding operation performed by the local media controller. Generally, the seeding operation involves passing negative charge carriers (e.g., electrons) generated during the program refresh operation through at least one seeding path defined by at least one string of cells of a memory array, where each string of cells includes a respective cell of the set of cells that is addressable by a given bitline and source line. For example, the negative charge carriers can be generated during the program verify operation. The negative charge carriers are passed through the string to reach the cell addressable by the selected wordline in an attempt to make the potential of the channel (e.g., pillar) approximately equal to the first bias voltage. To perform the seeding operation, the local media controller can cause a first bias voltage to be applied to the at least one string of cells (via its respective bitline or source line), and a second bias voltage to be applied to other wordlines that exist in the region between the selected wordline and the bitline (or source line). The seeding can be performed using a seeding mask pattern, which can be a random mask pattern.

If non-erased data (e.g., user) is stored in one or more of the cells of a string addressable by the other wordlines, then the non-erased data can block the seeding path defined by the string. For example, if the seeding mask pattern is a random mask pattern, then at least one seeding path through at least one string of cells may be blocked. A blocked seeding path could result in a collection of the negative charge carriers within the channel. The collection of these negative charge carriers can result in a negative channel voltage that can cause program disturb.

To address the collection of negative charges that can result from a blocked seeding path, the local media controller can cause GIDL with respect to the string of cells defining the blocked seeding path. GIDL refers to tunneling-based leakage currents from the drain of a field-effect transistor (FET) due to the (partial) overlap region that exists between the drain and the gate of the FET. The GIDL achieved during the seeding operation can generate a corresponding number of positive charge carriers (e.g., holes) that are supplied into the channel to neutralize the negative charge carriers collected within the blocked seeding path. Accordingly, embodiments described herein can exploit GIDL, which is typically an undesirable phenomenon, to achieve improvements of the memory device.

GIDL can be realized from at least one of the drain-side of the memory array or the source-side of the memory array. To cause GIDL on the drain-side for a string of cells, the local media controller can cause respective bias voltages to be applied to the bitline and a drain-side select gate (SGD) connected to the string of cells. The magnitude of the difference between the bias voltages applied to the bitline and the SGD controls the amount of GIDL that is realized from the drain-side, which controls the number of positive charge carriers that are supplied into the channel from the drain-side to neutralize the negative charge carriers. To cause GIDL on the source-side for a string of cells, the local media controller can cause respective voltage biases to be applied to the source line and a source-side select gate (SGS) connected to the string of cells. The magnitude of the difference between the bias voltages applied to the source line and the SGS controls the amount of GIDL that is realized from the source-side, which controls the number of positive charge carriers that are supplied into the channel from the source-side to neutralize the negative charge carriers.

In some embodiments, a non-negative bias voltage can be applied to the bitline and/or the source line, and a non-positive bias voltage can be applied to the SGD and/or the SGS. For example, the bias voltage applied to the bitline can range between about 0 volts (V) to about 5 V, the bias voltage applied to the SGD can range between about −5 V to about 0 V. At least a portion of the cells within the string connected to respective wordlines can be grounded (e.g., at about 0 V) to allow for the movement of the positive charge carriers generated by the GIDL through the string. In some embodiments, all of the cells within the string connected to respective wordlines are grounded to allow for the movement of positive charge carriers from both the drain-side and the source-side. As mentioned above, the difference between the bias voltages applied to the bitline and SGD and source line and SGS control the number of positive charge carriers that are supplied from drain-side and the source-side, respectively.

Biasing the bitline and/or source line to high voltages (e.g., greater than or equal to 5 V) to cause drain-side GIDL and/or source-side GIDL can result in disturb effects. Examples of disturb effects include erase disturb and/or program disturb. For example, the high positive bias voltage applied to the bitline and/or the source line can cause erase disturb from stress due to the grounding of the cells. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD and/or the SGS. For example, a 3.5 V bias voltage applied to the bitline and a −4 V bias voltage applied to the SGD can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage to the SGD and/or the SGS.

Due to memory device size and/or design constraints, it may be impractical or impossible in some implementations to apply such high magnitude negative bias voltages to the SGD and/or the SGS. In some embodiments, GIDL can be realized from a single side of the memory array (e.g., drain-side or source-side), depending on the location of the WL selected for the program refresh operation, in a manner that reduces disturb effects (e.g., erase disturb and/or program disturb).

After performing the seeding operation, the local media controller can initiate the additional loop of the program refresh operation. For example, initiating the additional loop can include setting a new program pulse. The new program pulse can have a voltage magnitude greater than the previous program pulse used to program the set of cells during the previous loop. For example, the new program pulse can have a voltage magnitude equal to the previous program pulse plus a voltage delta (i.e., the difference between the voltage magnitude of the new program pulse and the voltage magnitude of the previous program pulse is the voltage delta). The local media controller can then similarly perform the programming using the new program pulse, and perform the program verify operation to determine whether another loop of the program refresh operation should be performed.

Since charge loss can be logarithmic, the program refresh operation described herein can be performed on a logarithmic time interval. For example, a first program refresh operation can be performed after 10 hours, a second program refresh operation can be performed after 100 hours, a third program refresh operation can be performed after 1,000 hours, etc. Further details regarding implementing program refresh with GIDL will be described in further detail below with reference to FIGS. 1A-8.

Advantages of the present disclosure include, but are not limited to, improved memory device performance and reliability. For example, embodiments described herein can increase read margin for storing more bits within a cell of a memory device (or increase read margin for storing the same number of bits within a cell of a memory device).

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement program refresh with gate-induced drain leakage (GIDL) seeds in the memory device 130. In such an embodiment, program refresh (PR) component 137 can be implemented using hardware or as firmware, stored on memory device 130, executed by the control logic (e.g., local media controller 135) to perform the operations related to performing program refresh with GIDL seeds as described herein. In some embodiments, the memory sub-system controller 115 includes at least a portion of PR component 137. For example, the memory sub-system controller 115 can include a processor 117 (e.g., a processing device) configured to execute instructions stored in local memory 119 for performing the operations described herein. The PR component 137 can be included within a memory die ("die") of a multi-die memory device. For example, memory device 130 can represent one memory die and can include PR component 137 as illustrated. Similarly, memory sub-system 110 can include multiple other memory devices (i.e., separate memory dies), which can each include a respective PR component.

For example, the PR component 137 can initiate a loop of the program refresh operation with respect to a selected wordline of the memory device 130. Initiating the loop can include setting a program pulse. Prior to initiating the loop of the program refresh operation, the local media controller 135 can read out data from the memory device 130, send the data to the memory sub-system controller 115 to perform error correction using error correction code (ECC) to obtain error-corrected data, receive the error-corrected data from the memory sub-system controller 115, and initiate the loop of the program refresh operation after receiving the error-corrected data.

After initiating the loop of the program refresh operation, the PR component 137 can program a set of cells addressable by the selected wordline. More specifically, the set of cells can be programmed with the program pulse. The PR component 137 can then initiate a program verify operation with respect to the set of cells. The PR component 137 can determine whether to perform an additional loop of the program refresh operation by determining whether the set of cells passes the program verify operation. More specifically, during the program verify operation, the PR component 137 can cause a target bias voltage to be applied to the selected wordline for sensing the set of cells. From the sensing, the PR component 137 can determine whether each cell of the set of cells has a higher $V_T$ than the target bias voltage. If so, then each cell of the set of cells have reached the target bias voltage and the additional loop is not needed (i.e., the current loop is the final loop). Thus, the program refresh operation will conclude for the selected wordline.

Otherwise, if the least one cell of the set of cells does not have a higher $V_T$ than the target bias voltage), then the program refresh loop can further include a seeding operation performed by the PR component 137. To perform the seeding operation, the PR component 137 can cause a first bias voltage to be applied to the at least one string of cells (via its respective bitline or source line), and a second bias voltage to be applied to other wordlines that exist in the region between the selected wordline and the bitline (or source line). The seeding can be performed using a seeding mask pattern, which can be a random mask pattern.

If non-erased data (e.g., user) is stored in one or more of the cells of a string addressable by the other wordlines, then the non-erased data can block the seeding path defined by the string. For example, if the seeding mask pattern is a random mask pattern, then at least one seeding path through at least one string of cells may be blocked. A blocked seeding path could result in a collection of the negative charge carriers within the channel (e.g., negative charge carriers generated during the program verify operation). The collection of these negative charge carriers can result in a negative channel voltage that can cause program disturb.

To address the collection of negative charges that can result from a blocked seeding path, the PR component 137 can cause GIDL with respect to the string of cells defining the blocked seeding path. GIDL refers to tunneling-based leakage currents from the drain of a field-effect transistor (FET) due to the (partial) overlap region that exists between the drain and the gate of the FET. The GIDL achieved during the seeding operation can generate a corresponding number of positive charge carriers (e.g., holes) that are supplied into the channel to neutralize the negative charge carriers collected within the blocked seeding path.

GIDL can be realized from at least one of the drain-side of the memory array or the source-side of the memory array. To cause GIDL on the drain-side for a string of cells, the PR component 137 can cause respective bias voltages to be applied to the bitline and a drain-side select gate (SGD) connected to the string of cells. The magnitude of the difference between the bias voltages applied to the bitline and the SGD controls the amount of GIDL that is realized from the drain-side, which controls the number of positive charge carriers that are supplied into the channel from the drain-side to neutralize the negative charge carriers. To cause GIDL on the source-side for a string of cells, the PR component 137 can cause respective voltage biases to be applied to the source line and a source-side select gate (SGS) connected to the string of cells. The magnitude of the difference between the bias voltages applied to the source line and the SGS controls the amount of GIDL that is realized from the source-side, which controls the number of positive charge carriers that are supplied into the channel from the source-side to neutralize the negative charge carriers.

In some embodiments, a non-negative bias voltage can be applied to the bitline and/or the source line, and a non-positive bias voltage can be applied to the SGD and/or the SGS. For example, the bias voltage applied to the bitline can range between about 0 V to about 5 V, the bias voltage applied to the SGD can range between about −5 V to about 0 V. At least a portion of the cells within the string connected to respective wordlines can be grounded (e.g., at about 0 V) to allow for the movement of the positive charge carriers generated by the GIDL through the string. In some embodiments, all of the cells within the string connected to respective wordlines are grounded to allow for the movement of positive charge carriers from both the drain-side and the source-side. As mentioned above, the difference between the bias voltages applied to the bitline and SGD and source line and SGS control the number of positive charge carriers that are supplied from drain-side and the source-side, respectively.

Biasing the bitline and/or source line to high voltages (e.g., greater than or equal to 5 V) to cause drain-side GIDL and/or source-side GIDL can result in disturb effects. Examples of disturb effects include erase disturb and/or program disturb. For example, the high positive bias voltage applied to the bitline and/or the source line can cause erase disturb from stress due to the grounding of the cells. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD and/or the SGS. For example, a 3.5 V bias voltage applied to the bitline and a −4 V bias voltage applied to the SGD can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage to the SGD and/or the SGS.

Due to memory device size and/or design constraints, it may be impractical or impossible in some implementations to apply such high magnitude negative bias voltages to the SGD and/or the SGS. In some embodiments, GIDL can be realized from a single side of the memory array (e.g., drain-side or source-side), depending on the location of the WL selected for the program refresh operation, in a manner that reduces disturb effects (e.g., erase disturb and/or program disturb).

After performing the seeding operation, the PR component 137 can initiate the additional loop of the program refresh operation. For example, initiating the additional loop can include setting a new program pulse. The new program pulse can have a voltage magnitude greater than the previous program pulse used to program the set of cells during the previous loop. For example, the new program pulse can have a voltage magnitude equal to the previous program pulse plus a voltage delta (i.e., the difference between the voltage magnitude of the new program pulse and the voltage magnitude of the previous program pulse is the voltage delta). The PR component 137 can then similarly perform the programming using the new program pulse, and perform the program verify operation to determine whether another loop of the program refresh operation should be performed.

Since charge loss can be logarithmic, the program refresh operation described herein can be performed on a logarithmic time interval. For example, a first program refresh operation can be performed after 10 hours, a second program refresh operation can be performed after 100 hours, a third program refresh operation can be performed after 1,000 hours, etc. Further details regarding implementing program refresh with GIDL will be described in further detail below with reference to FIGS. 2-7.

Figure 1B:
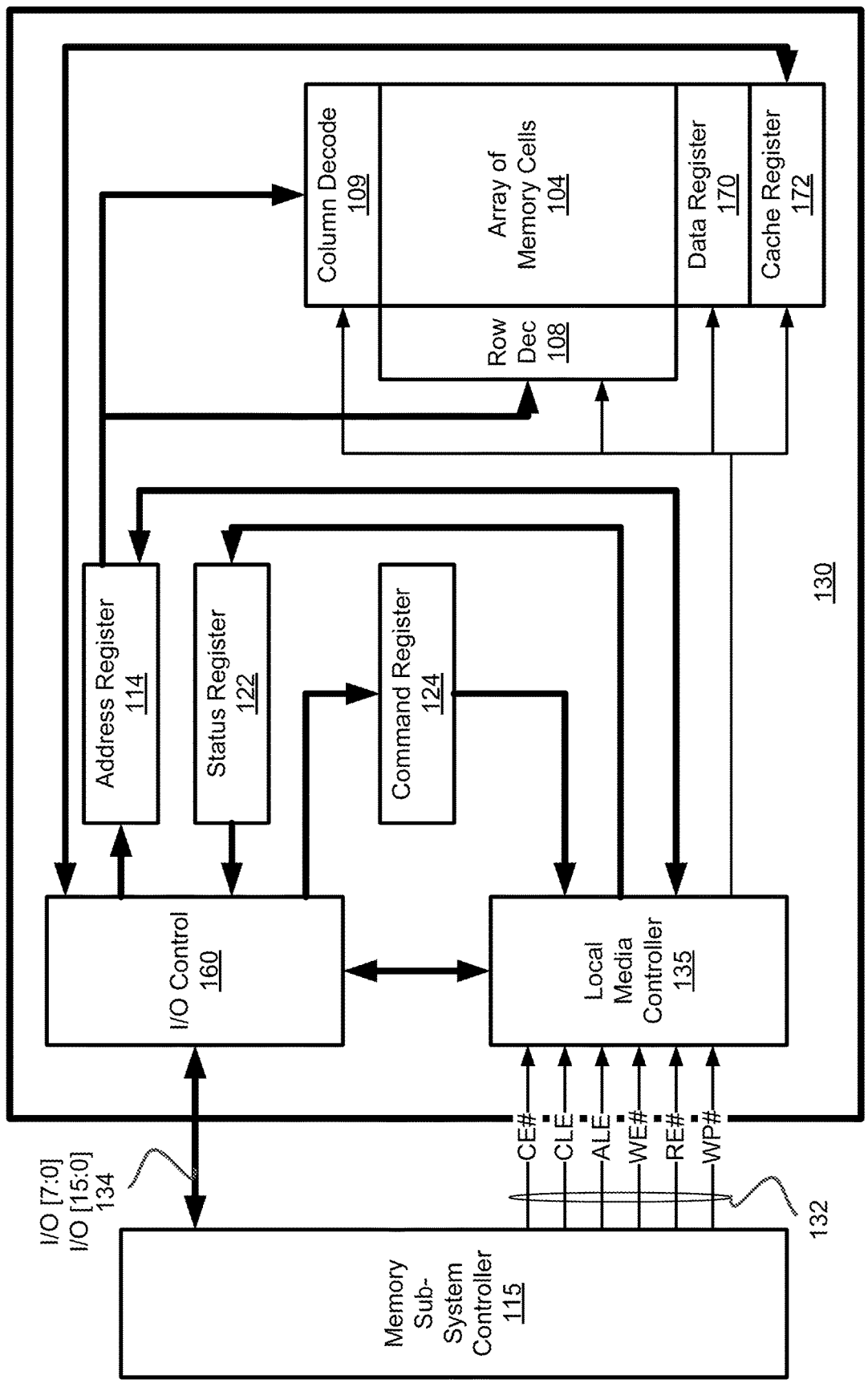
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104. In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
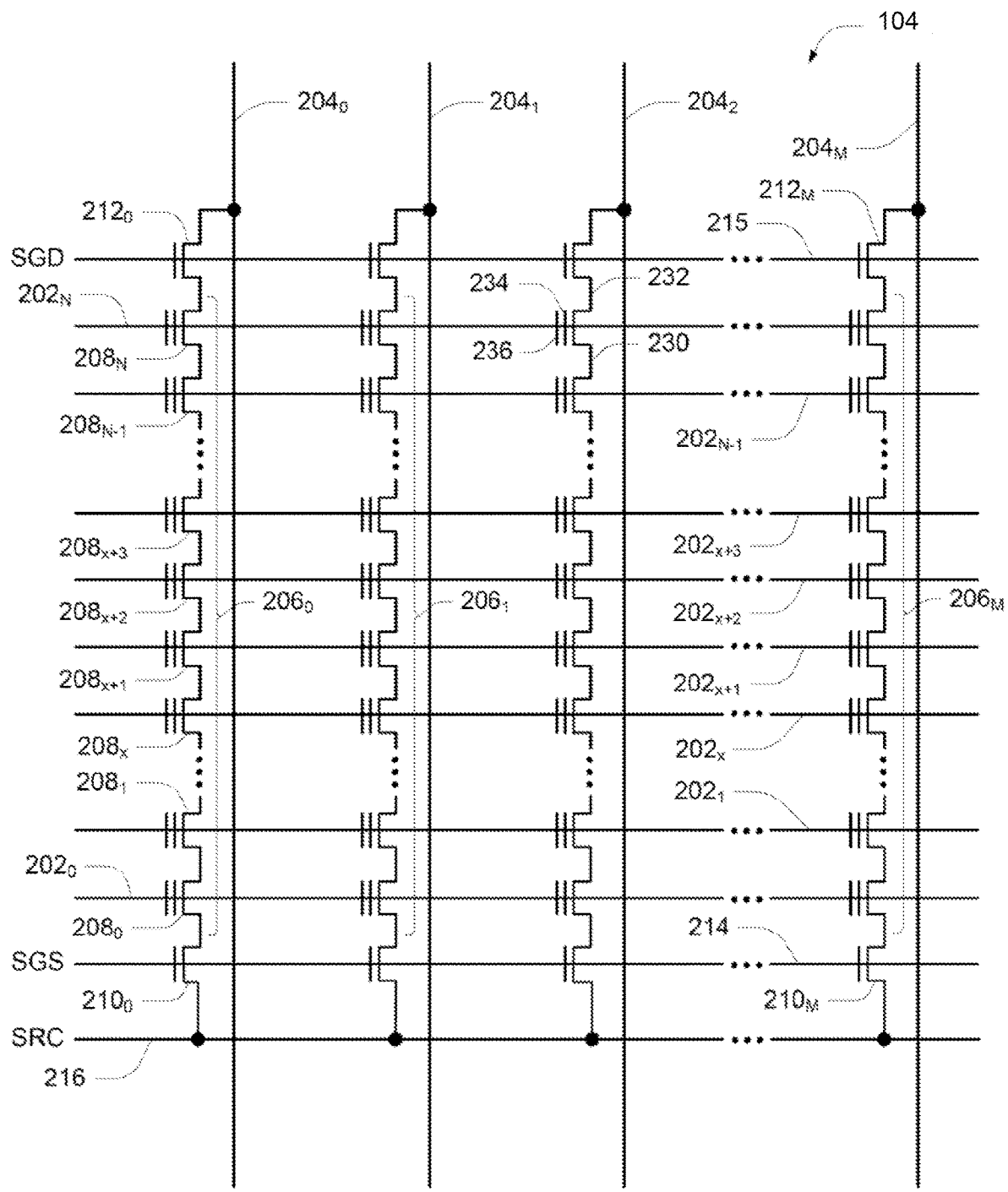
FIG. 2 is a schematic of portions of an array of memory cells, in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $206_0$ to $206_M$. Each NAND string 206 can be connected (e.g., selectively connected) to a common source line (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
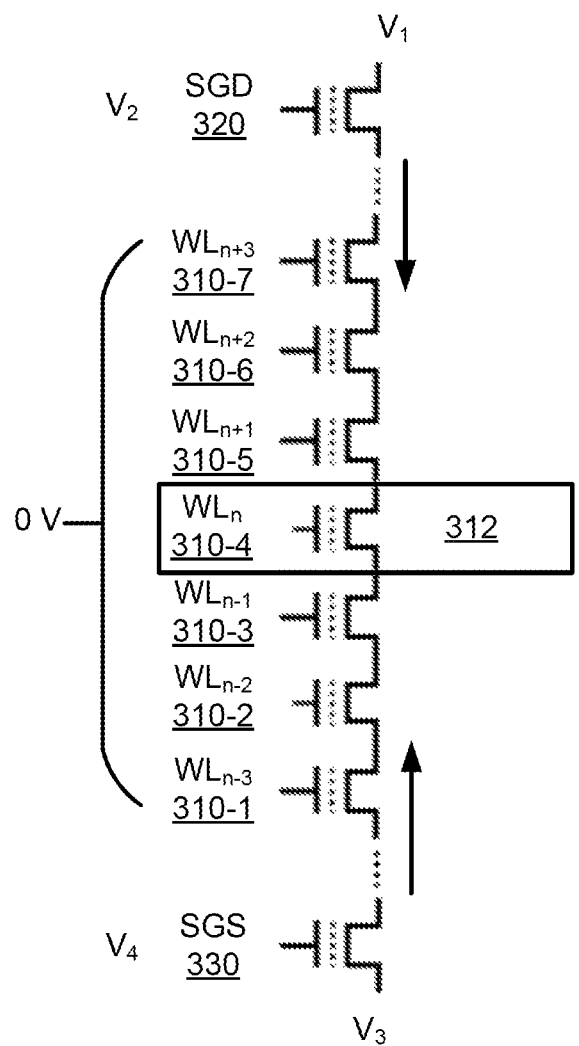

FIG. 3 is a diagram illustrating an example of program refresh with gate-induced drain leakage (GIDL) seeds implemented for a portion of an array of memory cells ("portion") 300, in accordance with some embodiments of the present disclosure. More specifically, the portion 300 can correspond to cells addressable by (e.g., connected to) a particular bitline (not shown) of the array.

As shown, the portion 300 includes a string of cells addressable by respective wordlines (WLs). The WLs include $WL_{n-3}$ 310-1 through $WL_{n+3}$ 310-7. For example, cell 312 is addressable by $WL_n$ 310-4. In this example, $WL_n$ 310-4 is a wordline selected for program refresh. The portion 300 further includes a drain-side select gate (SGD) 320 and a source-side select gate (SGS) 330. Although not shown in FIG. 3, the portion 300 further includes a common source line connected to SGS 330, similar to SRC 216 described above with reference to FIG. 2.

In this illustrative example, GIDL is being caused on the drain-side and/or the source-side. For example, to cause GIDL on the drain-side, the bitline can be biased to a voltage "$V_1$" and SGD 320 can be biased to a voltage "$V_2$". The difference between $V_1$ and $V_2$ defines the amount of GIDL from the drain-side and thus the amount of positive charge carriers (e.g., holes) that are generated on the drain-side. In some embodiments, $V_1$ is a non-negative voltage and $V_2$ is a non-positive voltage. For example, $V_1$ can range from about 0 V to about 5 V, and $V_2$ can range from about −5 V to about 0 V. In an embodiment, $V_1$ can be about 5 V and $V_2$ can be about −2.5 V.

As another example, to cause GIDL on the source-side, the source line can be biased to a voltage "$V_3$" and SGS 330 can be biased to a voltage "$V_4$". The difference between $V_3$ and $V_4$ defines the amount of GIDL from the source-side and thus the amount of positive charge carriers that are generated on the source-side. In some embodiments, $V_3$ is a non-negative voltage and $V_4$ is a non-positive voltage. For example, $V_3$ can range from about 0 V to about 5 V, and $V_4$ can range from about −5 V to about 0 V. In an embodiment, $V_3$ can be about 5 V and $V_2$ can be about −2.5 V.

Moreover, it is assumed that all of the cells of the string, including the cells addressable by $WL_{n-3}$ 310-1 through $WL_{n+3}$ 310-7, are biased to a ground voltage, represented in FIG. 3 as "0 V", to enable the positive charge carriers generated by the drain-side and/or the source-side to travel through the channel. The arrows shown in FIG. 3 illustrate the direction that the positive charge carriers travel through the channel (e.g., pillar) from the respective drain-side and source-side.

Biasing the bitline and/or source line to high voltages (e.g., greater than or equal to 5 V) can result in disturb effects (e.g., erase disturb and/or program disturb). For example, the high positive bias voltage applied to the bitline and/or the source line can cause erase disturb from stress when the cell wordlines are grounded. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD 320 and/or the SGS 330. For example, a 3.5 V bias voltage applied to the bitline and a −4 V bias voltage applied to the SGD 320 can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage only to the SGD 320 and/or the SGS 330.

Due to memory device size and/or design constraints, it may be impractical or impossible in some implementations to apply such high magnitude negative bias voltages to SGD 320 and/or SGS 330. As will now be described below with reference to FIGS. 4-5, in some embodiments, GIDL can be realized on a single side of the memory array (e.g., drain-side or source-side), depending on the location of the WL selected for the program refresh operation, in a manner that reduces disturb effects (e.g., erase disturb and/or program disturb).

FIG. 4 is a diagram illustrating an example of program refresh with gate-induced drain leakage (GIDL) seeds implemented for a portion of an array of memory cells ("portion") 400, in accordance with some embodiments of the present disclosure. More specifically, the portion 400 can correspond to cells addressable by (e.g., connected to) a particular bitline (not shown) of the array.

As shown, the portion 400 includes a string of cells addressable by (e.g., connected to) respective wordlines (WLs). The WLs include $WL_{n-5}$ 410-1 through $WL_{n+1}$ 410-7. For example, cell 412 is addressable by $WL_n$ 410-6. In this example, $WL_n$ 410-6 is a wordline selected for program refresh. The portion 400 further includes a drain-side select gate (SGD) 420 and a source-side select gate (SGS) 430. Although not shown in FIG. 4, the portion 400 further includes a common source line connected to SGS 430, similar to SRC 216 described above with reference to FIG. 2.

In this illustrative example, the WLs of the memory array can be divided into a drain-side group of WLs and a source-side group of WLs. More specifically, the drain-side group of WLs includes $WL_n$ 410-6 and each of the WLs closer to SGD 420 relative to $WL_n$ 410-6 (e.g., $WL_{n+1}$ 410-7). The source-side group of WLs includes each of the WLs closer to SGS 430 relative to $WL_n$ 410-6 (e.g., $WL_{n-5}$ 410-1 through $WL_{n-1}$ 410-5). Accordingly, $WL_n$ 410-6 separates the drain-side group of WLs from the source-side group of WLs.

In this illustrative example, GIDL is realized from the drain-side only. For example, to cause GIDL on the drain-side, the bitline can be biased to a voltage "$V_1$" and SGD 420 can be biased to a voltage "$V_2$". The difference between $V_1$ and $V_2$ defines the amount of GIDL from the drain-side and thus the amount of positive charge carriers (e.g., holes) that are generated on the drain-side. In some embodiments, $V_1$ is a non-negative voltage and $V_2$ is a non-positive voltage. For example, $V_1$ can range from about 0 V to about 5 V, and $V_2$ can range from about −5 V to about 0 V. In an embodiment, $V_1$ can be about 5 V and $V_2$ can be about −2.5 V.

The cells addressable by the WLs of the drain-side group (including cell 412) are biased to ground (represented in FIG. 4 as "0 V") to enable the positive charge carriers generated by the drain-side to travel through the channel. The arrow shown in FIG. 4 illustrates the direction that the positive charge carriers travel through the channel (e.g., pillar) from the drain-side. To reduce disturb effects (e.g., erase disturb and/or program disturb), the cells addressable by the WLs of the source-side group can be biased to a non-ground voltage "$V_3$". In some embodiments, $V_3$ is a negative voltage. For example, $V_3$ can be a negative voltage having a magnitude equal to the magnitude of $V_1$.

FIG. 5 is a diagram illustrating an example of program refresh with gate-induced drain leakage (GIDL) seeds implemented for a portion of an array of memory cells ("portion") 500, in accordance with some embodiments of the present disclosure. More specifically, the portion 500 can correspond to cells addressable by (e.g., connected to) a particular bitline (not shown) of the array.

As shown, the portion 500 includes a string of cells addressable by (e.g., connected to) respective wordlines (WLs). The WLs include $WL_{n-1}$ 510-1 through $WL_{n+5}$ 510-7. For example, cell 512 is addressable by $WL_n$ 510-6. In this example, $WL_n$ 510-6 is a wordline selected for program refresh. The portion 500 further includes a drain-side select gate (SGD) 520 and a source-side select gate (SGS) 530. Although not shown in FIG. 5, the portion 500 further includes a common source line connected to SGS 530, similar to SRC 216 described above with reference to FIG. 2.

In this illustrative example, the WLs of the memory array can be divided into a source-side group of WLs and a drain-side group of WLs. More specifically, the source-side group of WLs includes $WL_n$ 510-2 and each of the WLs closer to SGS 520 relative to $WL_n$ 510-2 (e.g., $WL_{n-1}$ 510-1). The drain-side group of WLs includes each of the WLs closer to SGD 430 relative to $WL_n$ 510-2 (e.g., $WL_{n+1}$ 510-3 through $WL_{n+5}$ 510-7). Accordingly, WU 510-2 separates the source-side group of WLs from the drain-side group of WLs.

In this illustrative example, GIDL is being caused on the source-side only. For example, to cause GIDL on the source-side, the source line can be biased to a voltage "$V_1$" and SGS 520 can be biased to a voltage "$V_2$". The difference between $V_1$ and $V_2$ defines the amount of GIDL caused on the source-side and thus the amount of positive charge carriers (e.g., holes) that are generated on the source-side. In some embodiments, $V_1$ is a non-negative voltage and $V_2$ is a non-positive voltage. For example, $V_1$ can range from about 0 V to about 5 V, and $V_2$ can range from about −5 V to about 0 V. In an embodiment, $V_1$ can be about 5 V and $V_2$ can be about −2.5 V.

The cells addressable by the WLs of the source-side group (including cell 512) are biased to ground (represented in FIG. 5 as "0 V") to enable the positive charge carriers generated by the drain-side to travel through the channel (e.g., pillar). The arrow shown in FIG. 5 illustrates the direction that the positive charge carriers travel through the channel from the source-side. To reduce disturb effects (e.g., erase disturb and/or program disturb), the cells addressable by the WLs of the drain-side group can be biased to a non-ground voltage "$V_3$". In some embodiments, $V_3$ is a negative voltage. For example, $V_3$ can be a negative voltage having a magnitude equal to (or approximately equal to) the magnitude of $V_1$.

Figure 6:
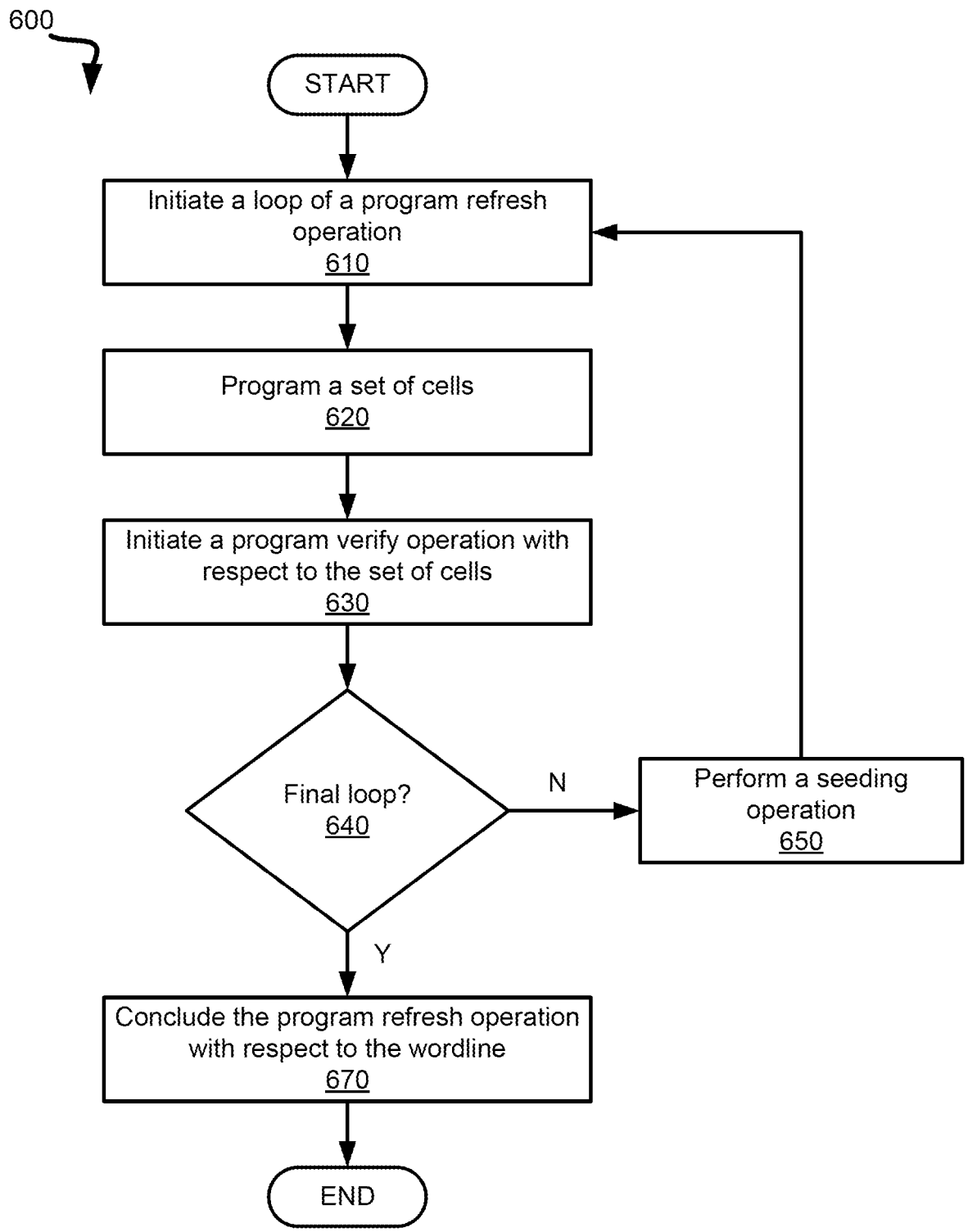
FIG. 6 is a flow diagram of an example method for implementing program refresh with gate-induced drain leakage (GIDL), in accordance with some embodiments of the present disclosure.

FIG. 6 is a flow diagram of an example method 600 for implementing program refresh with gate-induced drain leakage, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the local media controller 135 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, a loop of a program refresh operation is initialized. For example, control logic (e.g., local media controller 135) can cause the loop of the program refresh operation to be initialized with respect to a wordline of a memory array. The loop of the program refresh operation can be initiated in response to receiving a request to perform the program refresh operation (e.g., via the memory sub-system controller 115). The request can include a selection of the wordline for performing the program refresh operation. In some embodiments, the loop of the program refresh operation is initiated after receiving error-corrected data from the memory sub-system controller. Initiating the program refresh operation can further include setting a program pulse.

At operation 620, a set of cells is programmed. For example, control logic can cause the set of cells, addressable by the selected wordline, to be programmed (e.g., reprogrammed) using the program pulse.

At operation 630, a program verify operation is initiated with respect to the set of cells. For example, control logic can cause the program verify operation to be initiated with respect to the set of cells. More specifically, during the program verify operation, control logic can cause a target bias voltage to be applied to the selected wordline for sensing the set of cells for sensing the set of cells.

At operation 640, it is determined whether the loop is a final loop of the program refresh operation based on a result of the program verify operation. For example, control logic can determine whether the loop is a final loop by determining whether the set of cells passes the program verify operation. To do so, control logic can determine, from the sensing, whether each cell of the set of cells has a higher $V_T$ than the target bias voltage.

If it is determined that the loop is not the final loop (e.g., the set of cells does not pass the program verify operation), then an additional loop of the program refresh operation will be performed. At operation 650, a seeding operation is performed. For example, control logic can cause the seeding phase to be performed with respect to at least one string of cells of the memory array, where each string of cells includes a respective cell of the set of cells that is addressable by a given bitline and source line. Generally, the seeding operation involves passing negative charge carriers (e.g., electrons) through at least one seeding path defined by the at least one string of cells. The negative charge carriers are generated during the program refresh operation (e.g., the program verify operation). The negative charge carriers pass through the string to reach the cell addressable by the selected wordline in an attempt to make the potential of the channel approximately equal to the first bias voltage. To perform the seeding operation, the local media controller can cause a first bias voltage to be applied to the at least one string of cells (via its respective bitline or source line), and a second bias voltage to be applied to other wordlines that exist in the region between the selected wordline and the bitline (or source line). The seeding can be performed using a seeding mask pattern, which can be a random mask pattern.

If non-erased data (e.g., user) is stored in one or more of the cells of a string addressable by the other wordlines, then the non-erased data can block the seeding path defined by the string. For example, if the seeding mask pattern is a random mask pattern, then at least one seeding path through at least one string of cells may be blocked. A blocked seeding path could result in a collection of the negative charge carriers within the channel. The collection of these negative charge carriers can result in a negative channel voltage that can cause program disturb.

To address the collection of negative charge carriers (e.g., electrons) within the channel due to blockage of a seeding path, control logic can cause GIDL with respect to the string of cells defining the blocked seeding path. The GIDL achieved during the seeding operation can generate a corresponding number of positive charge carriers (e.g., holes) that are supplied into the channel to neutralize the negative charge carriers collected within the blocked seeding path.

Control logic can cause GIDL on at least one of a drain-side of the memory array or a source-side of the memory array. For example, causing GIDL on the drain-side can include causing a first bias voltage to be applied to the bitline and a second bias voltage to be applied to the drain-side select gate (SGD). The difference between these bias voltages defines the amount of GIDL from the drain-side and thus the amount of positive charge carriers that are generated on the drain-side. In some embodiments, the first bias voltage is a non-negative voltage, and the second bias voltage is a non-positive voltage. For example, the first bias voltage can range from about 0 V to about 5 V, and the second bias voltage can range from about −5 V to about 0 V. In an embodiment, the first bias voltage can be about 5 V and the second bias voltage can be about −2.5 V.

As another example, causing GIDL on the source-side can include causing a third bias voltage to be applied to the source line and a fourth bias voltage to be applied to the source-side select gate (SGS). The difference between these bias voltages defines the amount of GIDL from the source-side and thus the amount of positive charge carriers that are generated on the source-side. In some embodiments, the third bias voltage is a non-negative voltage and the fourth bias voltage is a non-positive voltage. For example, the third bias voltage can range from about 0 V to about 5 V, and the fourth bias voltage can range from about −5 V to about 0 V. In an embodiment, the third bias voltage can be about 5 V and the fourth bias voltage can be about −2.5 V. In some embodiments, the first bias voltage is equal to the third bias voltage. In some embodiment, the second bias voltage is equal to the fourth bias voltage. In some embodiments, the first bias voltage is different from the third bias voltage. In some embodiments, the second bias voltage is different from the fourth bias voltage.

In some embodiments, control logic can cause a grounding voltage (e.g., about 0 V) to be applied to all of the wordlines of the memory array to ground all of the cells of the string of cells. This can enable the positive charge carrier to travel through the channel from the drain-side and/or the source-side.

Biasing the bitline and/or source line to high voltages (e.g., greater than or equal to 5 V) can result in disturb effects (e.g., erase disturb and/or program disturb). For example, the high positive bias voltage applied to the bitline and/or the source line can cause erase disturb from stress when the cell wordlines are grounded. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD and/or the SGS. For example, a 3.5 V bias voltage applied to the bitline and a −4 V bias voltage applied to the SGD can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage to the SGD and/or the SGS.

Due to memory device size and/or design constraints, it may be impractical or impossible in some implementations to apply such high magnitude negative bias voltages to the SGD and/or the SGS. In some embodiments, GIDL can be caused on a single side of the memory array (e.g., drain-side or source-side), depending on the location of the wordline selected for the program refresh operation, in a manner that reduces disturb effects (e.g., erase disturb and/or program disturb).

For example, the drain-side only embodiment can be used in the event that the wordline selected for the program refresh operation is closer to the drain-side of the memory array (e.g., closer to the SGD). Here, the first and second bias voltages applied to the bitline and the SGD, respectively, can be similar to those described above. However, control logic can cause the grounding voltage to be applied to the source line and the SGS. Moreover, for the at least one string of cells, the wordlines can be divided into a drain-side group and a source-side group. The drain-side group includes the wordline selected for the program refresh operation and any additional wordlines that are closer to the drain-side of the memory array than the selected wordline. The source-side group includes the remaining wordlines. Control logic can cause the grounding voltage to be applied to the wordlines of the drain-side group to ground the cells addressable by the wordlines of the drain-side group. Control logic can cause a fifth bias voltage to be applied to the wordlines of the source-side group to bias the cells addressable by the wordlines of the source-side group. In some embodiments, the fifth bias voltage is a negative voltage. For example, the fifth bias voltage can be a negative voltage having a magnitude equal to the magnitude of the first bias voltage.

As another example, the source-side only embodiment can be used in the event that the wordline selected for the program refresh operation is closer to the source-side of the memory array (e.g., closer to the SGS). Here, the third and fourth bias voltages applied to the source line and the SGS, respectively, can be similar to those described above. However, control logic can cause the grounding voltage to be applied to the bitline and the SGD. Moreover, for the at least one string of cells, the wordlines can be divided into a source-side group and a drain-side group. The source-side group includes the wordline selected for the program refresh operation and any additional wordlines that are closer to the source-side than the selected wordline. The drain-side group includes the remaining wordlines. Control logic can cause the grounding voltage to be applied to the wordlines of the source-side group to ground the cells addressable by the wordlines of the source-side group. Control logic can cause the fifth bias voltage to be applied to the wordlines of the drain-side group to bias the cells addressable by the wordlines of the drain-side group. Further details regarding operation 650 will be described below with reference to FIG. 7.

After performing the seeding operation, the process can revert back to operation 610 to initiate the additional loop of the program refresh operation. For example, initiating the additional loop of the program refresh operation can include setting a new program pulse. The new program pulse can have a voltage magnitude greater than the previous program pulse used to program the set of cells during the previous loop. For example, the new program pulse can have a voltage magnitude equal to the previous program pulse plus a voltage delta (i.e., the difference between the voltage magnitude of the new program pulse and the voltage magnitude of the previous program pulse is the voltage delta). The process can move to operation 620 to program the set of cells using the new program pulse.

If the loop of the program refresh operation is determined to be a final loop at operation 640, then control logic at operation 670 can conclude the program refresh operation with respect the wordline. The method 600 can be performed again for another wordline of the memory array. The program refresh operation can be applied any suitable number of times in order to recover RWB by tightening the width of $V_T$ distributions. Further details regarding operations 610-660 are described above with reference to FIGS. 1A-5 and FIG. 7.

Figure 7:
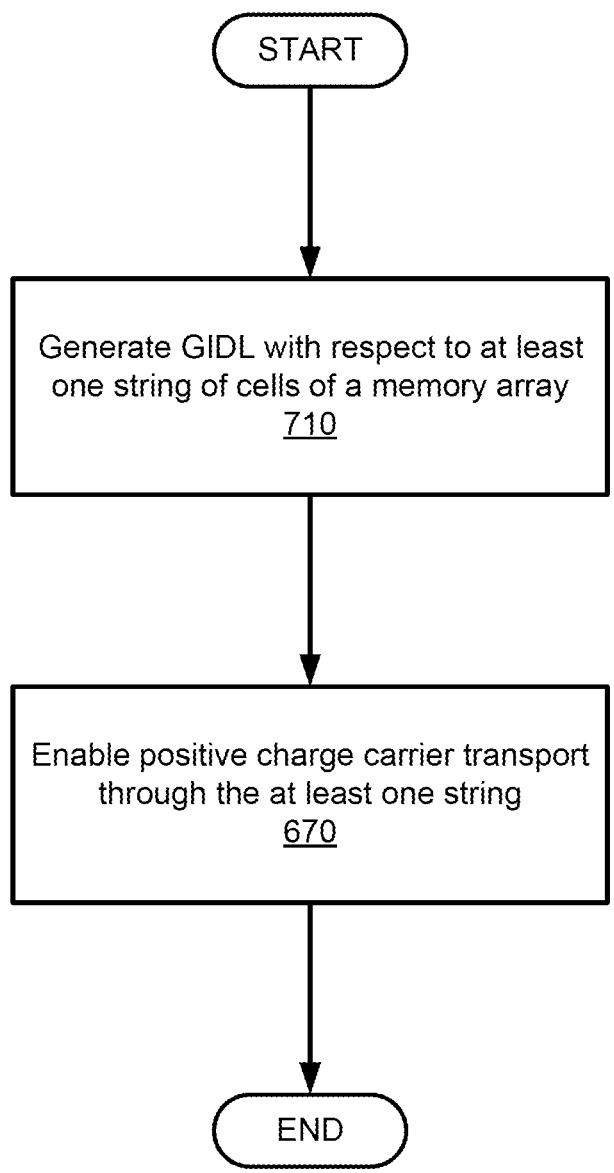
FIG. 7 is a flow diagram of an example method for causing gate-induced drain leakage (GIDL) in a memory array, in accordance with some embodiments of the present disclosure.

FIG. 7 is a flow diagram of an example method 700 for causing gate-induced drain leakage (GIDL) in a memory array, in accordance with some embodiments of the present disclosure. For example, the method 700 can be performed during operation 620 of FIG. 6. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by local media controller 135 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, GIDL is generated with respect to at least one string of cells of a memory array. For example, control logic (e.g., local media controller 135) can cause a set of bias voltages to be applied with respect to the least one string of cells to generate the GIDL. The GIDL generated by the set of bias voltages can generate positive charge carriers (e.g., holes) that can travel through the channel.

For example, the set of bias voltages can include a first bias voltage applied to the bitline connected to the at least one string of cells and a second bias voltage applied to the drain-side select gate (SGD) connected to the at least one string of cells. The first bias voltage and the second bias voltage can generate GIDL from the drain-side of the memory array ("drain-side GIDL") that can travel toward the source-side of the memory array. The difference between these bias voltages defines the amount of drain-side GIDL and thus the amount of positive charge carriers that are generated on the drain-side. In some embodiments, the first bias voltage is a non-negative voltage and the second bias voltage is a non-positive voltage. For example, the first bias voltage can range from about 0 V to about 5 V, and the second bias voltage can range from about −5 V to about 0 V. In an embodiment, the first bias voltage can be about 5 V and the second bias voltage can be about −2.5 V.

Additionally or alternatively, the set of bias voltages can include a third bias voltage applied to the source line connected to the at least one string of cells and a fourth bias voltage applied to the source-side select gate (SGS) connected to the at least one string of cells. The third bias voltage and the fourth bias voltage can generate GIDL from the source-side of the memory array ("source-side GIDL") that can travel toward the drain-side of the memory array. The difference between these bias voltages defines the amount of source-side GIDL and thus the amount of positive charge carriers that are generated on the source-side. In some embodiments, the third bias voltage is a non-negative voltage and the fourth bias voltage is a non-positive voltage. For example, the third bias voltage can range from about 0 V to about 5 V, and the fourth bias voltage can range from about −5 V to about 0 V. In an embodiment, the third bias voltage can be about 5 V and the fourth bias voltage can be about −2.5 V. In some embodiments, the first bias voltage is equal to the third bias voltage. In some embodiment, the second bias voltage is equal to the fourth bias voltage. In some embodiments, the first bias voltage is different from the third bias voltage. In some embodiments, the second bias voltage is different from the fourth bias voltage.

Biasing the bitline and/or source line to high voltages (e.g., greater than or equal to 5 V) can result in disturb effects (e.g., erase disturb and/or program disturb). For example, the high positive bias voltage applied to the bitline and/or the source line can cause erase disturb from stress when the cell wordlines are grounded. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD and/or the SGS. For example, a 3.5 V bias voltage applied to the bitline and a −4 V bias voltage applied to the SGD can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage only to the SGD and/or the SGS.

At operation 720, positive charge carrier transport is enabled through the at least one string. For example, control logic can cause a grounding voltage (e.g., about 0 V) to be applied to a set of wordlines to ground cells of the at least one string addressable by the wordlines of the set of wordlines. In some embodiments, the set of wordlines includes all of the wordlines of the memory array, and all of the cells of the at least one string are grounded.

Due to memory device size and/or design constraints, it may be impractical or impossible in some implementations to apply such high magnitude negative bias voltages to the SGD and/or the SGS. In some embodiments, GIDL can be realized on a single side of the memory array (e.g., drain-side or source-side), depending on the location of the wordline selected for the program refresh operation, in a manner that reduces disturb effects (e.g., erase disturb and/or program disturb).

For example, the drain-side only embodiment can be used in the event that the wordline selected for the program refresh operation is closer to the drain-side of the memory array (e.g., closer to the SGD). Here, the first and second bias voltages applied to the bitline and the SGD, respectively, can be similar to those described above. However, control logic can cause the grounding voltage to be applied to the source line and the SGS. Moreover, for the at least one string of cells, the wordlines can be divided into a drain-side group and a source-side group. The drain-side group includes the wordline selected for the program refresh operation and any additional wordlines that are closer to the drain-side of the memory array than the selected wordline. The source-side group includes the remaining wordlines.

The drain-side group of wordlines in this example defines the set of wordlines to which the grounding voltage is applied. More specifically, control logic can cause the grounding voltage to be applied to the wordlines of the drain-side group to ground the cells addressable by the wordlines of the drain-side group. Control logic can cause a fifth bias voltage to be applied to the wordlines of the source-side group to bias the cells addressable by the wordlines of the source-side group. In some embodiments, the fifth bias voltage is a negative voltage. For example, the fifth bias voltage can be a negative voltage having a magnitude equal to the magnitude of the first bias voltage.

As another example, the source-side only embodiment can be used in the event that the wordline selected for the program refresh operation is closer to the source-side of the memory array (e.g., closer to the SGS). Here, the third and fourth bias voltages applied to the source line and the SGS, respectively, can be similar to those described above. However, control logic can cause the grounding voltage to be applied to the bitline and the SGD. Moreover, for the at least one string of cells, the wordlines can be divided into a source-side group and a drain-side group. The source-side group includes the wordline selected for the program refresh operation and any additional wordlines that are closer to the source-side than the selected wordline. The drain-side group includes the remaining wordlines.

The source-side group of wordlines in this example defines the set of wordlines to which the grounding voltage is applied. Control logic can cause the grounding voltage to be applied to the wordlines of the source-side group to ground the cells addressable by the wordlines of the source-side group. Control logic can cause the fifth bias voltage to be applied to the wordlines of the drain-side group to bias the cells addressable by the wordlines of the drain-side group. Further details regarding operations 710-720 are described above with reference to FIGS. 1A and 3-6.

Figure 8:
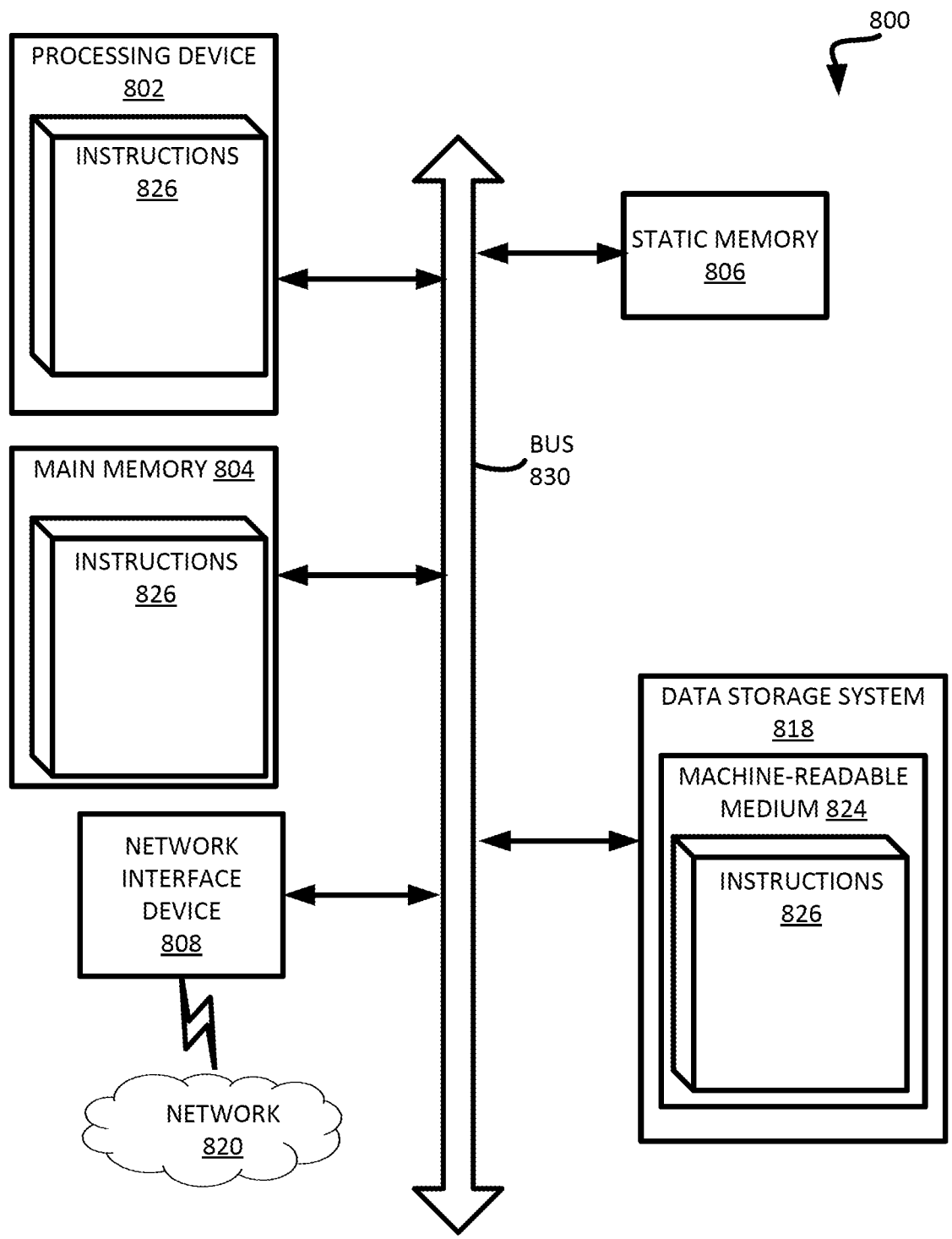
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 and/or the PR component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a local media controller and/or PR component (e.g., the local media controller 135 and/or the PR component 137 of FIG. 1A). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array comprising:
a plurality of wordlines; and
at least one string of cells, each cell of the at least one string of cells being addressable by a respective wordline of the plurality of wordlines; and
control logic, operatively coupled with the memory array, to perform operations with respect to a loop of a program refresh operation, the operations comprising:
generating gate-induced drain leakage (GIDL) with respect to the at least one string of cells;
causing a grounding voltage to be applied to a set of wordlines of the plurality of wordlines to ground each cell of the at least one string of cells addressable by each wordline of the set of wordlines, wherein the grounding voltage applied to the set of wordlines enables transport of positive charge carriers generated by the GIDL that are used to neutralize negative charge carriers generated by the program refresh operation;
determining whether the loop is a final loop of the program refresh operation; and
in response to determining that the loop is not the final loop, causing a seeding operation to be performed.

2. The memory device of claim 1, wherein the set of wordlines is the plurality of wordlines.

3. The memory device of claim 1, wherein the set of wordlines comprises a subset of the plurality of wordlines.

4. The memory device of claim 1, wherein generating the GIDL comprises causing a set of bias voltages to be applied with respect to the at least one string of cells.

5. The memory device of claim 4, wherein:
the at least one string of cells is connected to a bitline and a drain-side select gate (SGD) and; and
the set of bias voltages comprises a non-negative bias voltage applied to the bitline and a non-positive bias voltage applied to the SGD to generate drain-side GIDL.

6. The memory device of claim 4, wherein:
the at least one string of cells is connected to a source-side select gate (SGS) and a source line; and
the set of bias voltages comprises a non-negative bias voltage applied to the source line and a non-positive bias voltage applied to the SGS to generate source-side GIDL.

7. The memory device of claim 1, wherein the operations are performed during a seeding operation of a loop of the program refresh operation, wherein the positive charge carriers neutralize negative charge carriers generated during the program refresh operation, and wherein the program refresh operation is performed with respect to a selected wordline of the plurality of wordlines.

8. The memory device of claim 7, wherein the operations further comprise:
initiating the loop of the program refresh operation;
causing a set of cells addressable by the selected wordline to be programmed; and
initiating a program verify operation performed with respect to the set of cells, wherein a result of the program verify operation is used to determine whether the loop is the final loop;
determining whether the loop is a final loop based on a result of the program verify operation; and
in response to determining that the loop is not the final loop, causing the seeding operation to be performed.

9. A method comprising:
generating, by a processing device, gate-induced drain leakage (GIDL) with respect to at least one string of cells of a memory array, wherein each cell of the at least one string of cells is addressable by a respective wordline of a plurality of wordlines; and causing, by the processing device, a grounding voltage to be applied to a set of wordlines of the plurality of wordlines to ground each cell of the at least one string of cells addressable by each wordline of the set of wordlines, wherein the grounding voltage applied to the set of wordlines enables transport of positive charge carriers generated by the GIDL with respect to a loop of a program refresh operation that are used to neutralize negative charge carriers generated by the program refresh operation;

determining, by the processing device, whether the loop is a final loop of the program refresh operation; and in response to determining that the loop is not the final loop, causing, by the processing device, a seeding operation to be performed.

10. The method of claim 9, wherein the set of wordlines is the plurality of wordlines.

11. The method of claim 9, wherein the set of wordlines comprises a subset of the plurality of wordlines.

12. The method of claim 9, wherein generating the GIDL comprises causing a set of bias voltages to be applied with respect to the at least one string of cells.

13. The method of claim 12, wherein:
the at least one string of cells is connected to a bitline and a drain-side select gate (SGD) and; and
the set of bias voltages comprises a non-negative bias voltage applied to the bitline and a non-positive bias voltage applied to the SGD to generate drain-side GIDL.

14. The method of claim 12, wherein:
the at least one string of cells is connected to a source-side select gate (SGS) and a source line; and
the set of bias voltages comprises a non-negative bias voltage applied to the source line and a non-positive bias voltage applied to the SGS to generate source-side GIDL.

15. The method of claim 9, wherein the GIDL is generated and the grounding voltage is applied during a seeding operation of a loop of the program refresh operation, wherein the positive charge carriers neutralize negative charge carriers generated during the program refresh operation, and wherein the program refresh operation is performed with respect to a selected wordline of the plurality of wordlines.

16. The method of claim 15, further comprising:
initiating, by the processing device, the loop of the program refresh operation;
causing, by the processing device, a set of cells addressable by the selected wordline to be programmed; and
initiating, by the processing device, a program verify operation performed with respect to the set of cells, wherein a result of the program verify operation is used to determine whether the loop is the final loop;

determining, by the processing device, whether the loop is a final loop based on a result of the program verify operation; and in response to determining that the loop is not the final loop, causing, by the processing device, the seeding operation to be performed.

17. A memory device comprising:
a memory array comprising:
a plurality of wordlines; and
at least one string of cells, each cell of the at least one string of cells being addressable by a respective wordline of the plurality of wordlines; and
control logic, operatively coupled with the memory array, to perform operations comprising:
initiating a loop of a program refresh operation with respect to a selected wordline of the plurality of wordlines;
causing a set of cells addressable by the selected wordline to be programmed;
initiating a program verify operation performed with respect to the set of cells;
determining whether the loop is a final loop based on a result of the program verify operation; and
in response to determining that the loop is not the final loop, performing a seeding operation, wherein performing the seeding operation comprises:
causing a set of bias voltage to be applied with respect to the at least one string of cells to generate gate-induced drain leakage (GIDL) with respect to the at least one string of cells, wherein the GIDL generates positive charge carriers; and
causing a grounding voltage to be applied to a set of wordlines of the plurality of wordlines to ground each cell of the at least one string of cells addressable by each wordline of the set of wordlines, wherein the grounding voltage applied to the set of wordlines enables transport of the positive charge carriers to neutralize a collection of negative charge carriers generated during the program refresh operation.

18. The memory device of claim 17, wherein the set of wordlines is the plurality of wordlines.

19. The memory device of claim 17, wherein the set of wordlines comprises a subset of the plurality of wordlines.

20. The memory device of claim 17, wherein:
the at least one string of cells is connected to a bitline, a source line, a drain-side select gate (SGD) and a source-side select gate; and
the set of bias voltage comprises at least one of:
a non-negative bias voltage applied to the bitline and a non-positive bias voltage applied to the SGD to generate drain-side GIDL; or
a non-negative bias voltage applied to the source line and a non-positive bias voltage applied to the SGS to generate source-side GIDL.

* * * * *